Nov. 10, 1953     L. R. SAYER     2,659,066
INDICATOR DEVICE Filed March 3, 1951     6 Sheets-Sheet 1

INVENTOR
L. R. SAYER
BY
Henry N. Young
ATTORNEY

Nov. 10, 1953

L. R. SAYER 2,659,066

INDICATOR DEVICE

Filed March 3, 1951

INVENTOR
L.R. SAYER
BY Henry N. Young
ATTORNEY

Nov. 10, 1953  L. R. SAYER  2,659,066
INDICATOR DEVICE
Filed March 3, 1951  6 Sheets-Sheet 6

FIG. 14

INVENTOR
L. R. SAYER
BY Henry N. Young
ATTORNEY

Patented Nov. 10, 1953

2,659,066

UNITED STATES PATENT OFFICE 2,659,066

INDICATOR DEVICE

Laurence R. Sayer, San Leandro, Calif.

Application March 3, 1951, Serial No. 213,739

7 Claims. (Cl. 340—188)

1

The invention relates to an indicating device which is particularly adapted for use with a weighing scales.

A general object is to provide an indicator mechanism in which successive weighing, or other sensed, indications are provided by relatively large characters for their direct reading from a distance and at the same point without viewing reference to relatively movable elements.

Another object is to provide an indicator device of the character described in which an indication is retained until a controlling scales, or other sensing mechanism, is again used, whereby to eliminate a need for remembering an indication after the sensing cause ceases.

A further object is to provide an indicator device of the character described which is adapted and arranged for the association of a particularly simple printing means therewith for recording any or all indications of the device An added object of the invention is to provide an indicator device which is readily adaptable to provide number indications based on different units of measure.

Yet another object is to provide a unitary indicator method and means which is particularly simple and compact for its purposes.

The invention possesses other objects and features of advantage, some of which, with the foregoing, will be set forth or be apparent in the following description thereof, and in the accompanying drawings, in which.

Figure 10 is a plan view taken at the line 10—10 in Figure 1.

Figure 11 is an enlarged fragmentary axial

2 section of a spindle-control structure shown in side elevation in Figure 4.

Figure 12 is an enlarged fragmentary plan section taken at the line 12—12 in Figure 4.

As particularly illustrated, the mechanism of my invention is provided on a support frame comprising upright front and back plates 16 and 17 unitarily connected by suitable spacing assemblies 18, and fixedly mounted on a base plate 19. The present mechanism may be installed at any convenient distance from a weighing scales (not shown) suitably controlling a rack bar 21 which has its position directly or indirectly sensed by the scales and extends upwardly between the frame plates 16 and 17 and through an opening 19' of the base plate for engaging a gear 22 mounted on a spindle 23 which is horizontally disposed and is slidably and rotatably journalled in and between suitable bearings provided on the frame plates 16 and 17. The side of the rack bar 21 opposite its toothed side and the gear 22 is slidably engageable with a guide arm 24 extending rigidly forwardly from the rear frame plate 17 for maintaining its engagement with the gear. The present indicator mechanism is enclosed in a casing 25 extending upwardly from the base plate 19, and having a front wall 26 and a rear wall 27 connected at their side edges by parallel side walls 28 and the walls 26 and 27 and 28 cooperatively support a top wall 29 which completes the casing as a generally dust-tight enclosure for the mechanism.

A centrally apertured support plate 31 of electrically non-conductive material is mounted on the front frame plate 16 slightly inwardly therefrom on bracket posts 32 extending rearwardly from the frame plate 16, and a switch arm 33 carried on the spindle 23 between the gear 22 and the plate 31 mounts a series of contacts disposed in a radial plane and engageable with contacts provided in coaxial circles thereof on the opposed face of the plate 31. As is particularly brought out in Figures 4 and 11, a reduced rear end portion 23' of the spindle 23 provides a conical bearing point at its inner end and is rotatably and slidably engaged through a line of ball bearings provided within a ball race member 34 fixed in the bore of a tubular member 35 fixedly mounted on the rear frame plate 17 at an opening therethrough which fixedly receives a reduced forward portion 35' of the member while an unreduced intermediate portion thereof is seated and fixed against the rear side of the plate as by bolts or rivets. The member 35 has a reduced portion 35'' extending rearwardly from its intermediate portion, and has its bore stepped to provide a smooth forward part freely receiving the spindle 23 while the inner end of its larger rearward portion fixedly receives the spindle-carrying ball race 34 opposite the shoulder of the bore.

Figures 10, 11, 12:
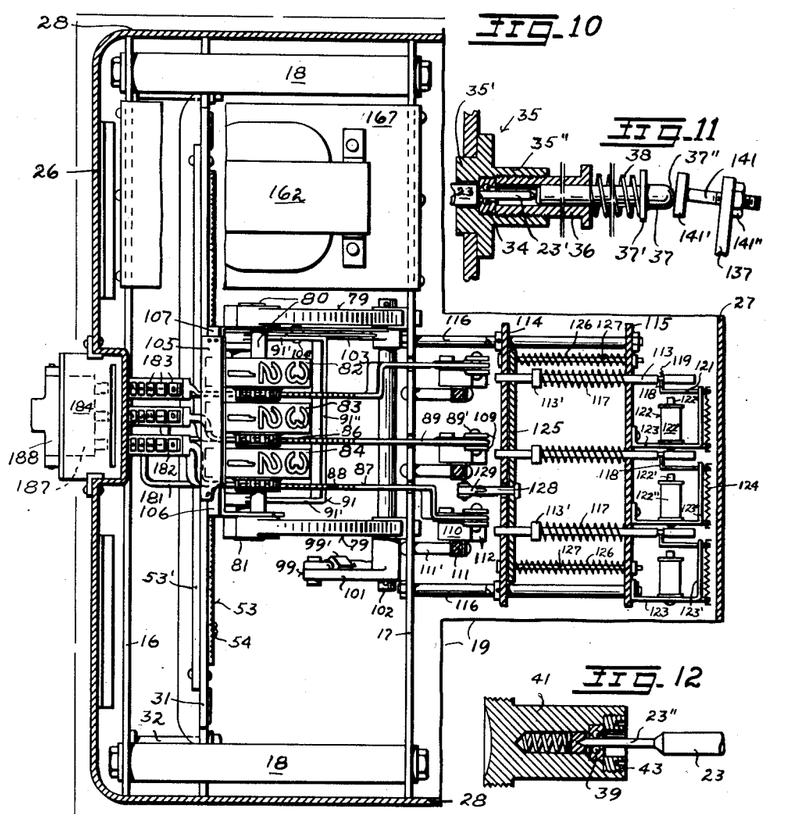

The portion of the bore of the member 35 rearwardly of its ball race 34 threadedly receives a sleeve member 36 having its forward end engaging the ball race 34 for securing the latter in its set position, and the bore of the member 36 slidably receives a plunger 37 extending rearwardly therefrom and providing an axial socket for engagement by the rear bearing point of the spindle. Adjacent its rearward end, the plunger 37 is provided with a flange 37' which is constantly engaged by a helical compression spring 38 receiving the plunger and seated against the rear end of the sleeve member 36 whereby the plunger is normally urged to a limiting rearward position in the sleeve. The extreme rearward plunger end portion is preferably rounded at 37'' for engagement by a member of a hereinafter-described spindle-displacing means for actuation to axially displace the plunger 37 and the spindle 23 for engaging the arm-carried electrical contacts with opposed contacts on the plate 31 as a selective multi-switch means.

Figures 4, 5:
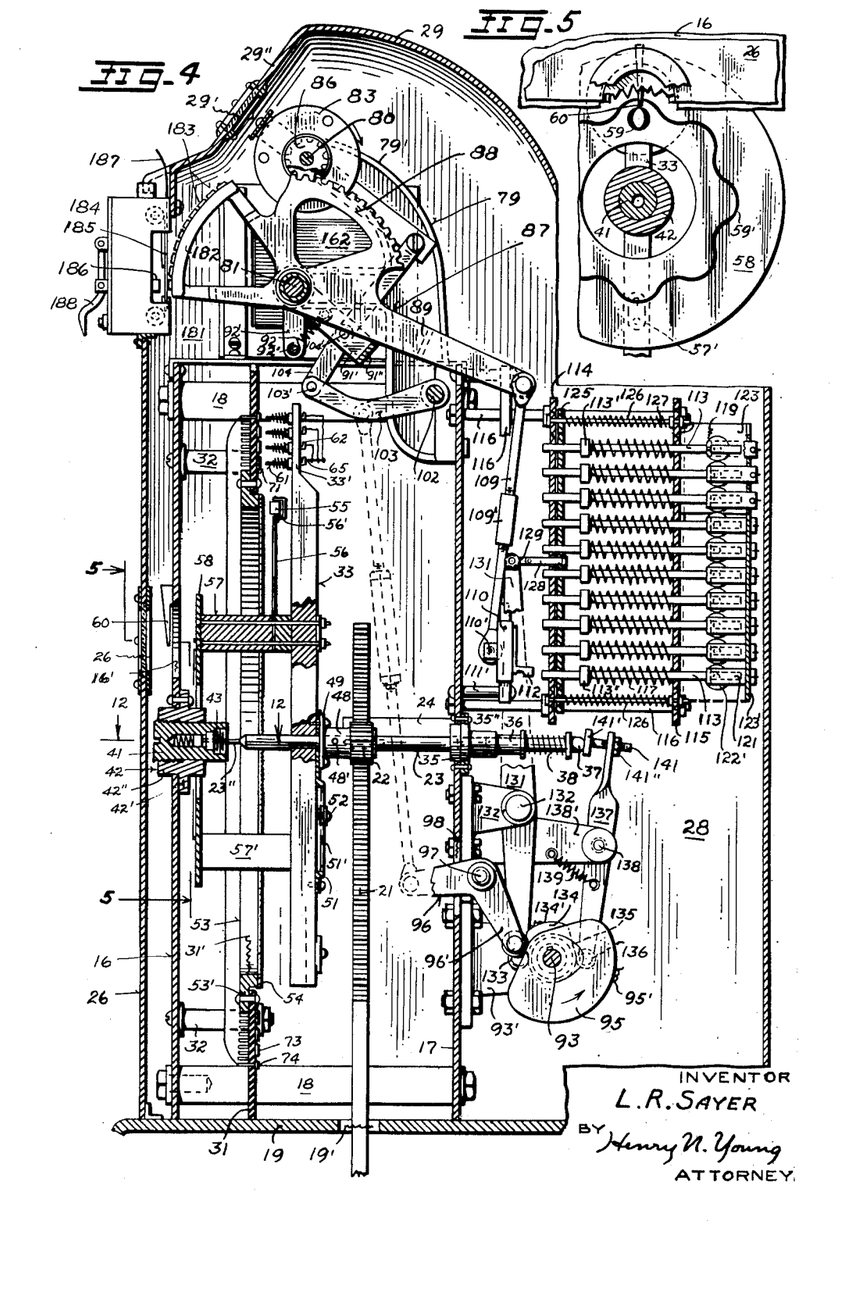
Figure 4 is a sectional view taken at the line 4—4 in Figure 3.
Figure 5 is a fragmentary view taken at the line 5—5 in Figure 3.

By particular reference to Figures 4 and 12, it will be noted that the forward end of the spindle 23 has a reduced portion 23'' terminating in a conical bearing point and rotatably and slidably engaged through a line of ball bearings provided within a ball race member 39 fixed in the bore of a socket member 41 which is in turn threadedly mounted in a support sleeve 42 extending through a complementary opening in the front plate 16, and secured to said plate at a radial flange 42' of the member 42 as by bolts or rivets. As is particularly brought out in Figure 12, the rearward end portion of the socket bore is double-stepped outwardly and rearwardly from a forward bore portion to provide a complementary seat for the ball race 39 at its inner step and a seat for a ring nut 43 at its larger rearward step, said ring nut threadedly engaging the rearward bore portion for its mounting against the ball race 39 to secure the latter in place in the member 35.

The smaller and forward portion of the bore of the member 41 slidably mounts a bearing block 44 providing a socket for receiving the opposed end point of the spindle 23, and a helical compression spring 45 is constantly operative between the closed rearward end of the socket space and the block 44 for urging the block rearwardly from the socket bore. The forward end of the member 41 is preferably provided with a diametric slot 41' providing for the application of a screwdriver bit therein for adjustably turning the member in the sleeve 42 which extends forwardly of the frame plate 16 for engaging the member 41 to retain it in set position. The present spindle-mounting arrangement is essentially such that the spindle may normally revolve freely in the bearings provided by the fixed ball races 34 and 39 yet is shiftable forwardly in said bearing from a normal rearward position imposed on it by the action of the spring 45.

It will now be noted that the gear 22 is provided at the rear end of a spindle-receiving hub-sleeve 48 which is secured in fixed adjusted position on the spindle by a setscrew 48' mounted therein. At its forward end, the hub member 48 provides an annular flange 49 for the attachment of the switch arm 33 thereto by screws 49' extending through a plate member 51 which is fixed to the arm and adjustably carries balancing weight elements 52, it being noted that the spindle extends transversely through the present switch arm intermediately thereof. As particularly illustrated in Figure 6, the member 51 has the general form of a triangle, is secured to the arm by pins or screws, and is provided with three slots 51' which are provided in forwardly offset portions of the member and are engaged by weight elements 52 which are of the nature of bolts and are adjustably mounted in place by having the offset plate portions adjacent the slots clamped between nut and head portions of the elements. In the present structure, one of said slots 51' of the member 51 extends longitudinally of and opposite the arm, while the other offsets provide slots 51' at opposite sides of the spindle in mutual alignment in a line which is perpendicular to the arm 33 and intersects the spindle axis, the arrangement being essentially such that the arm assembly may be precisely counter-balanced for a neutral equilibrium relation to the axis of the supporting spindle whereby the spindle-mounted assembly may be rotated and held set independently of the action of gravity.

Figures 6, 7, 8, 9:
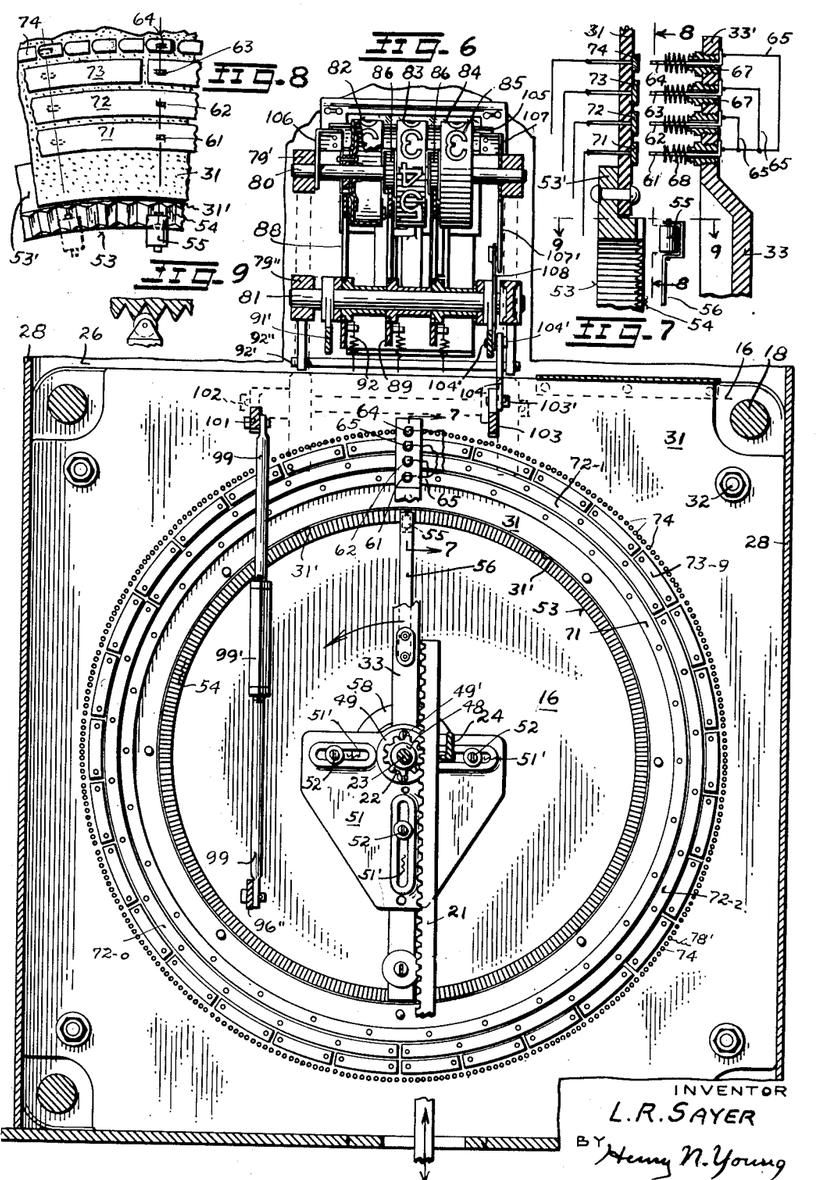
Figure 6 is a view taken at the broken line 6—6 in Figure 1.
Figure 7 is an enlarged fragmentary view taken at the line 7—7 in Figure 6.
Figure 8 is a fragmentary showing taken at the line 8—8 in Figure 7.
Figure 9 is a fragmentary view taken at the line 9—9 in Figure 7.

By particular reference to Figures 4 and 6 to 9 inclusive, it will be noted that the central opening 31' of the plate member 31 is circular and is coaxial with the spindle axis. A tubular member 53 of uniform cross-section radially thereof is fittedly engaged within the bore of the opening 31', and has a radial flange portion 53' opposite the forward side of the member 31 by which it is fixed to the member as by riveting. The member 53 has a continuously and uniformly toothed annular rear face 54 for engagement by a detent roller 55 carried by a leaf-spring arm 56 extending from the arm 33 and selectively engageable with the teeth of the face 54 to secure the positioned arm against rotation while switch contacts of the arm are operative against opposed switch contacts on the member 31 following an appropriate forward axial shifting of the spindle 23; the functioning of the roller 55 is illustrated in Figures 8 and 9. As is particularly brought out in Figure 4, the spring arm 56 extends inwardly along the arm 26 from the roller 55, mounts said roller in an offset forked terminal portion 56' thereof at its outer end, and has its inner end fixed to a bracket post 57 extending forwardly from a point of the arm 33 which is spaced from the spindle axis.

Means are preferably provided for checking the position which is assumed by the scales-operated weight-sensing rack bar 21 when the controlling scales are not in use, said means being directly associated with the spindle 23. As is particularly brought out in Figures 4 and 5, the spindle-mounted arm 33 fixedly carries a flat annulus 58 having a zero character 59 delineated thereon for viewing through mutually aligned sight openings 26' and 16' respectively provided in the front casing wall 26 and the wall frame member 16 for its registration with an index pointer 60 mounted on the plate 16 when the rack bar 21 is in true zero position; in this manner, the starting of a weighing from a true zero figure may be assured after any needed setting adjustment of the control for the bar 21 is made. For a reason to be hereinafter brought out, it is desirable that the weight-indicating means be reset only while the spindle is static; as particularly shown, a wavy line 59' is delineated on the forward face of the annulus 58 for viewing through the sight openings 26' and 16', said line having the character 59 in general alignment therewith, any rotation of the spindle being directly indicated by the apparent radial waving movement of the line 59' as viewed through the sight openings 26' and 16'. As particularly shown, the annulus 58 is mounted on the forward end of the bracket post 57 and on a similar bracket post 57' extending from the arm 33 at the opposite side of the spindle from the post 57, it being noted that the spring arm 56 extends from an intermediate point of the bracket 57.

It will now be noted that the portion 33' of the intermediately pivoted arm 33 which carries the post 57 terminally mounts four spring-pressed electrical contacts 61 and 62 and 63 and 64 disposed in a common plane in the line of the arm and respectively having terminal contact points directed toward and engageable with corresponding contacts 71 and 72 and 73 and 74 fixedly mounted on the mutually opposed face of the plate 24, the innermost arm contact 61 being connected by flexible wire conductors 65 to each of the other contacts 62 and 63 and 64. As is particularly brought out in Figures 7 and 8, each of the present contacts 61 to 64 inclusive comprise an L-shaped conductor strip having its longer portion slidably engaged through a complementary bore of a guide sleeve 67 of electrically non-conductive material fixedly engaged through the arm portion 33'. The shorter portions of the contact members 61 to 64 are arranged for their normal engagement against the rear ends of the sleeves 67 through the action of helical compression springs 68 receiving the extending parts of the members and cooperative between the forward ends of the sleeves and seat pins, or other projections, provided on the members adjacent their contact ends, it being understood that the wires 65 are soldered or otherwise secured to the members; the arrangement is essentially such that each of the contacts 62 and 63 and 64 is included in a branch of a circuit including the contact 61.

By particular reference to Figures 6 and 7 and 8 and 14, it will be noted that the contact 71 which is provided on the plate 24 for engagement by the arm-carried contact 61 comprises a continuous annular conductor having the center of its circle in the spindle axis. Each of the conductors 72 and 73 and 74 comprise one of a number of conductors arranged in circular lines concentric with the conductor 71, the conductors of each line thereof being disposed for selective engagement by the spring contacts 62 and 63 and 64 respectively. More specifically, each contact 72 extends through a one-hundred-twenty degree arc whereby there are three such contacts, each of the contacts 73 extends through a twelve degree arc whereby there are thirty such contacts, and there are three hundred contacts 74 in their circle. The arrangement is essentially such that as the rotatively positioned spindle 23 and the arm 33 are moved forwardly, the detent roller 55' will first engage teeth of the member 53 to secure the arm in its weight-set, or sensed, position, and the spring contacts 61 to 64 inclusive will thereafter yieldingly engage an appropriate contact 71 to 74 inclusive for establishing a closed switch condition thereat. This continuous contact 71 is connected by a wire 75 to a common source of electrical power for providing current to the branch circuits provided through the closed switches comprising the contact pairs 62—72, 63—73 and 64—74 when the contact 71 is engaged by the spring contact 61.

By way of example, and as indicated in Figure 6, the present arrangement has been specifically designed to indicate the digital values of a scale load not exceeding three hundred weight units in accordance with a correspondingly-sensed displacement of the rack bar 21 to rock the arm 33 from its normal zero position in a clockwise direction as viewed from the rear to an appropriate weight-sensed position of the arm. Accordingly, and starting at the bottom point of the contact array, the three contacts 72 correspond in order to the digits zero and one and two, the thirty contacts 73 correspond in successive groups of ten to the contacts 72 with the contacts of each group successively representing the digits zero to nine in order for the corresponding contacts 73, and there are sets of ten contacts 74 opposite and corresponding to each contact 73 for successively representing the digits zero to nine in order. If it be assumed that a unit of weight is represented by the digit one of the wheel 84, as representing, for instance, one pound, the present indicator circuit may provide a direct weight indication of any number from one to two-hundred ninety-nine inclusive entirely in accordance with the setting of the arm 26, it being understood that the present circuit-closing arrangement may be generally referred to as a multiple commutator switch.

When the arm 26 is positioned to dispose the spring contacts 61–64 inclusive directly above the spindle, as is particularly illustrated in Figure 6, connections are provided for an indicated weight of one hundred fifty weight units by reason of the facts that, when the arm 33 is moved forwardly by the spindle 23 which carries it, the contact 62 engages the second (one) contact 72, the contact 63 engages the sixteenth (five) contact 73, and the spring contact 64 engages the first (zero) contact 74 of the set of ten said contacts corresponding to the engaged contact 73. For a reason which will hereinafter appear, the three contacts 72 are connected by individual wires 76 in independent indicator control circuits, ten wires 77 having branches 77' connected to all corresponding contacts 73 of the sets thereof connect the contacts 73 to other different indicator control circuits, while ten wires 78 having branches 78' from all corresponding contacts 64 of their sets are parts of still different indicator control circuits, it being important to note that the full present indicating range is thus arranged to be provided by a total of solely the twenty-three indicator circuits including the three wires 76 and the ten wires 77 and the ten wires 78.

It will now be noted that like bracket arms 79 are mounted on the top of the rear frame plate 17 in upwardly extending relation to the plate and provide upper and lower arms 79' and 79'' which respectively carry support shafts 80 and 81 fixed to and between them. Like indicator wheels 82 and 83 and 84 are rotatably and coaxially mounted on the support shaft 80 and each bears on its periphery a circumferential line of ten characters 85 presenting the value numerals zero to nine in order and equally spaced in their lines. Shaft-receiving hubs of the wheels 82 and 83 and 84 mount like gears 86 upon corresponding wheel ends, and said wheels are suitably retained in fixed spaced relation along the mounting shaft 80 for mutually independent setting rotations thereof to dispose a numeral 85 opposite a glassed sight opening 29' provided in an oblique forward portion 29" of the casing top wall 29, it being noted that a three-digit multi-denominational number may thus be rendered visible through the sight opening in accordance with a given cooperative setting of the wheels 82 and 83 and 84. In the present arrangement, the indications of the wheels 82 and 83 and 84 are arranged to be respectively controlled from electric circuits including the fixed switch contacts 72 and 73 and 74.

Like rocker members 87 are rotatably mounted on the support shaft 81 and provide upwardly-directed coaxial gear segments 88 arranged for constant engagement with the gears 86 of the indicator wheels, and have rearwardly-directed arms 89. A U-shaped member 91 spans the rocker member assembly, has the free ends of its sides 91' receiving the shaft 81 in journalled relation thereto, and has its side-connecting portion 91" disposed horizontally below the rocker members 87 opposite the arms 89 thereof whereby a swinging movement of the member 91 to move its portion 91" upwardly is arranged to rock any engaged arms 89 for rocking the corresponding member 87 to rotate the associated number wheel for a display of larger numbers thereof at the sight opening 29'. Such a rocking displacement of each rocker member 87 is arranged to be effected against the resistance of a tension spring 92 connecting a point of the member rearwardly of the supporting shaft 81 with an anchor-bar 92' fixed to and between arms 92" depending from forward points of the lower bracket arms 79". It will be understood that when the common wheel-positioning member 91 is in the lowered position shown for it in Figure 4, the numbered wheel controlled by any rocker member 87 having its arm 89 engaging the portion 91" of the member 91 will present a zero reading opposite the sight opening 45', and that the effective length of the gear segments 88 is such that the numeral nine points of all of the wheels will be displayed opposite said sight opening when the member has been rocked to its limiting displaced position.

Figures 1, 3:
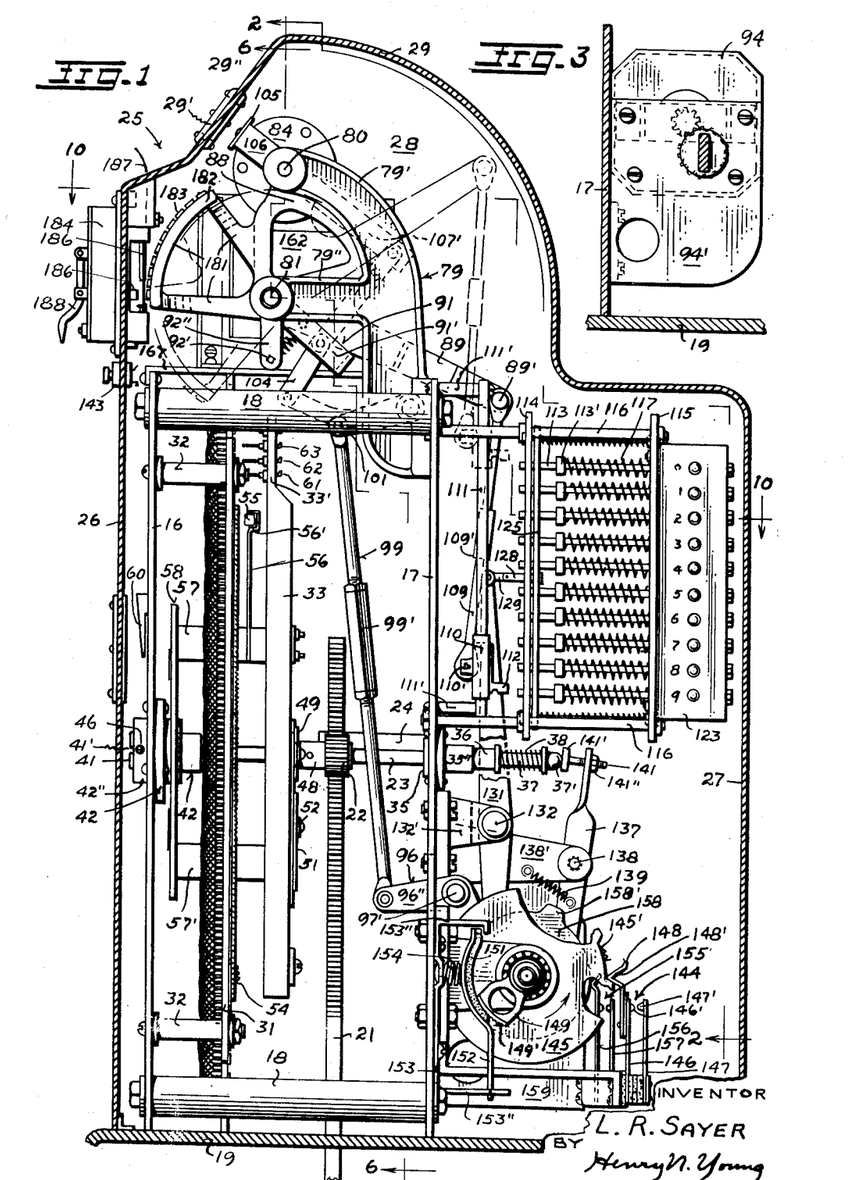
Figure 1 is a side elevation of an indicator mechanism embodying the devices of my invention.
Figure 3 is a fragmentary showing taken at the line 3—3 in Figure 2.
Figure 2:
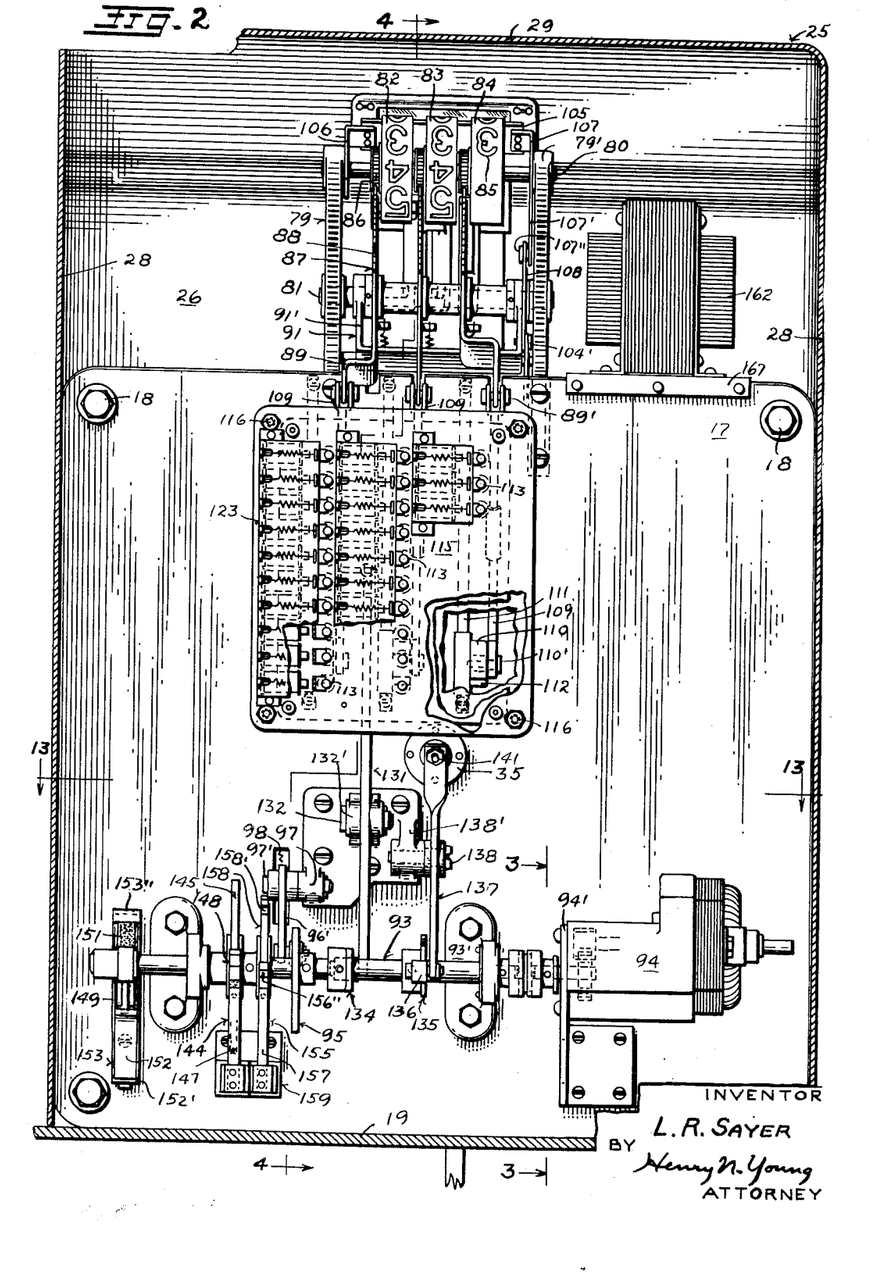
Figure 2 is a rear elevation of the mechanism of Figure 1 as viewed from the broken line 2—2 in Figure 1.
Figure 13:
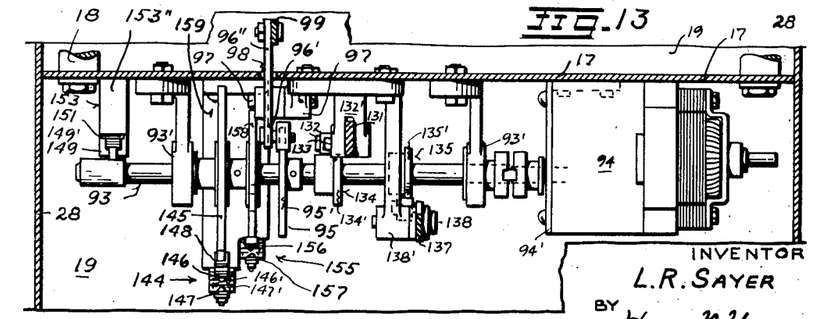
Figure 13 is a plan view taken below the line 13—13 in Figure 3.
Figure 14:
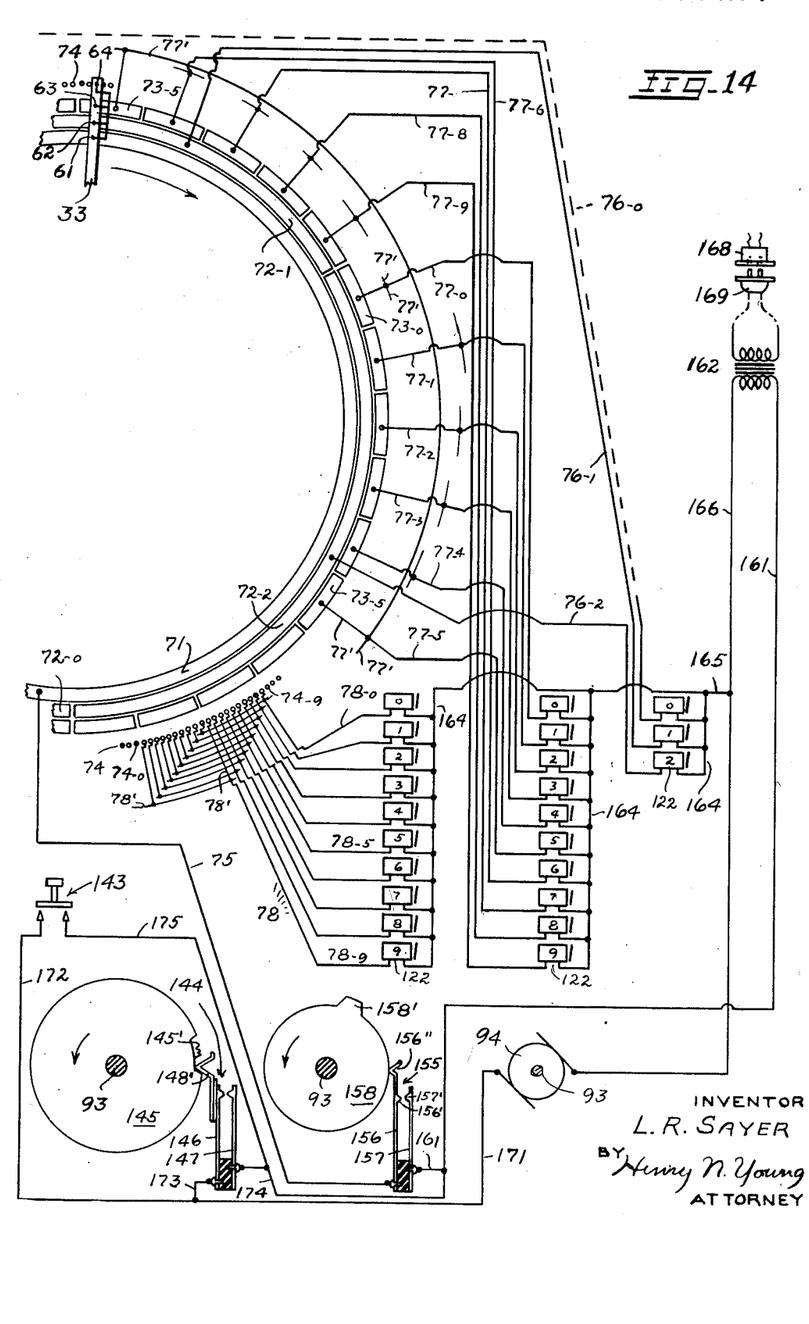
Figure 14 is a wiring diagram for the mechanism.

It will now be noted that an upward swinging of the wheel-positioning member 91 is arranged to be effected from a power-driven control shaft 93 which is arranged to be rotated by the mutually coaxial power out-put shaft of an electric motor 94 with which it is connected, as by a suitable universal joint; as is brought out in Figures 2 and 3 and 13, the present shaft 93 and motor 94 are respectively mounted on suitable brackets 93' and 94' extending rearwardly from the back frame plate 17 near its bottom. By particular reference to Figures 1 and 2 and 4 and 13, it will be noted that the shaft 93 carries a transverse plate cam 95 having its camming edge 95' operative against a generally depending arm 96' of a bell-crank lever 96 at a roller contact provided at the arm extremity, and that the bell-crank lever 96 is carried on a fulcrum pin 97' provided on a fixed bracket arm 97 extending rearwardly from the frame plate 17. The other arm 96" of the bell-crank lever 96 extends forwardly and freely through a slot 98 provided through the plate 17, and is hingedly connected at its forward end to the lower end of a laterally rigid link member 99 having its upper end connected to an arm 101 extending rigidly from a rock-shaft 102 which is journalled in and between the brackets 79 adjacent the frame plate 17 which mounts them.

The present arms 96" and 101 are operative in a common plane so disposed that the arm 101 may be mounted on a portion of the shaft 102 which extends laterally outwardly of the adjacent bracket 79, and the connecting link 99 has sections connected by a turnbuckle nut 99' whereby its effective length as a connection between said arms may be adjustably varied. An arm 103 extends rearwardly from the rock shaft 102 substantially in the plane of movement of a side 91' of a member 91, and a link 104 connects a hinge pin 103' at the extremity of the arm 103 with a hinge pin 104' mounted at the side 91'. In the present structure, the arm 103 is arched downwardly to provide a necessary clearance, it being understood that the effective length of this arm is the distance from the hinge pin 103' to the rock shaft 102. The present arrangement is essentially such that an upward swinging of the member 91 is operative to cause such a rocking of the elements 87 as to overset the various wheels 82 and 83 and 84 in limiting indicating positions slightly beyond the positions at which the numerals nine would be centrally displayed opposite the sight opening 42' of the casing, it being understood that any necessary adjustment may be made at the turnbuckle 99'.

Means are preferably provided for masking the number wheel numerals 85 during a resetting of the wheels, said means in the present structure comprising an elongated masking plate 105 which is supported from the shaft 80 and is automatically disposable as required. In the present structure, the plate 105 is fixed to and between the outer ends of mutually opposed cooperative arms 106 and 107 which are disposed adjacent the brackets 79 and receive the shaft 80 therethrough at like distances from the plate 105 to provide for an adjusted swinging of the mounted masking plate about the axis of the shaft 80. For controlling the position of the masking plate, the arm 107 is continued rearwardly beyond its pivot point to provide an extension 107' which has its rear end connected at a pivot pin 107" by a link 108 with the pivot pin 104' providing the connection for the link 104 at the side 91' of the wheel-shifting member 91. The relations are essentially such that the wheel numerals 85 opposite the sight opening 29' are arranged to be masked while the member 91 is displaced from its normal lowered position.

It will now be noted that the arms 89 of the rocker members 87 extend rearwardly over and beyond the top of the rear frame plate 17 and have links 109 of adjustable length depending from link pins 89' thereof, said links comprising sections connected by a turnbuckle 109'. The lower ends of the links 109 hingedly carry crosshead or slide-block members 110 which are arranged to be guided for their movements in parallel upright lines which lie in a plane parallel to the frame plate 17. As is particularly brought out in Figures 1 and 2 and 4 and 10, each crosshead 110 comprises a block providing an upright bore which slidably receives a guide bar 111 fixedly mounted on the frame in parallel spaced relation to the rear frame plate 17, mounts a pivot pin 110' having its axis horizontal and hingedly engaged in the bottom end of a link 109, and provides an arm 112 extending rigidly and rearwardly from the block. As particularly shown, the guide bars 111 are mounted at the rear ends of screw posts 111' extending rearwardly from the plate 17 and engaging their upper and lower ends. The arrangement is essentially such as to permit full swinging movements of the rocker members 87 between limiting lowered and raised positions of their arms while the corresponding cross-head arms 112 are each movable along a limited and fixed upright straight path.

Means are provided whereby the rearwardly-extending arms 112 of the cross-heads 110 may be utilized to prevent a return downward swinging of the arm 89 of the corresponding rocker 87 to secure the corresponding number wheel for the display of an appropriate numeral 85 corresponding to a circuit connection determined by a setting of the switch arm 33. As particularly shown, three sets of horizontally disposed stop pin members 113 are provided in vertical and evenly-spaced alignment in their sets for their selective projection into the paths of movement of the arms 112 as they are lowered from the highest position assumable by them. The stop pins 113 are spring-loaded, are normally held in withdrawn rearward positions out of the path of the arms 112, and are selectively releasable for appropriate operative projections thereof to provide supports beneath the corresponding arms 112 after the switch arm 33 has been disposed in a weighing position therefor. As is particularly brought out in Figures 1 and 4 and 10, each stop pin 113 is slidably engaged in coaxial guide bores provided through opposed parallel plate members 114 and 115, said plates being mounted on suitable bracket posts 116 extending rearwardly from the rear frame plate 17. The pins 113 are provided at corresponding points thereof between the plates 114 and 115 with flanges 113', and helical compression springs 117 receiving the pins and operative between the flanges 113' and the rear plate 115 constantly urge a projection of the pins 113 to limiting forward positions thereof in which they present their forward end portions in the paths of descent of the arms 112 of the cross-heads 110.

It will now be noted that the spring-loaded stop pins 113 are normally held against their projection by the points of dogs 118 engaging notches 119 provided in projecting rear portions of the pins and arranged for a selective withdrawal thereof by electromagnetic means to release the pins engaged by them. As is particularly brought out in Figure 10, the notches 119 comprise annular grooves in the round stop pins 113, and the dogs 118 comprise transverse offsets provided at the free extremities of swinging armatures 121 which are operative opposite the cores 122' of electromagnets 122 having their solenoids 122'' mounted on upright bracket arms 123 extending rearwardly from the plate 115. The sets of armatures 121 are intermediately and pivotally engaged through transverse extensions 123' of the bracket arms 123 to dispose the portions thereof providing the terminal dogs 118 opposite the cores 122' in transverse spaced relation thereto, and tension springs 124 connect the other armature ends with the plate 123 to constantly and yieldingly urge a retained engagement of the dogs in the notches 119 of the corresponding stop pins 113. The arrangement is essentially such that an energizing of a solenoid 122'' will electro-magnetically effect a withdrawal of a dog 118 from engagement with a pin notch 119 to provide for a permitted limited forward projection and disposal of the pin solely under the influence of the associated spring 117, while a sufficient pushing back of a previously freed stop pin is arranged to effect a reengagement of the corresponding dog in its notch 119 to retain the pin in withdrawn position, whereby the units comprising the armatures 121 and electromagnets 122 comprise electromagnetic catches.

Means are provided for effecting a rearward displacement of a projected pin for its retention in withdrawn position by a dog 118 engaging the notch 119, said means, for reasons to be hereinafter brought out, being arranged to be simultaneously operative against all forwardly projected pins of the different banks thereof to simultaneously re-set the pins in their retracted positions. As is particularly brought out in the sectional showings of Figures 4 and 10, a pin re-setting member in the form of a flat plate 125 freely receives therethrough the pin portions forwardly of the pin flanges 113' and is normally disposed in a forward position adjacent the rearward face of the front pin-carrying plate 114 under the influence of helical compression springs 126. The plate 125 is arranged for engagement as a stop by the pin flanges 113' when the pins are forwardly disposed, and a rearward movement of the plate 125 is arranged to force back any pins having their flanges 113' engaged with it to effect an operative retaining engagement of the dogs 118 in their notches 119. As shown, mutually parallel support and guide rods 127 are mounted on and between the plates 114 and 115, and are slidably engaged through complementary transverse openings of the plate 125 whereby the latter is reciprocably supported on them. The springs 126 receive the guide rods 127 therethrough and are operative between the re-setting plate 125 and the fixed plate 115 for yieldingly urging the normal forward disposal of the former plate.

A thrust rod 128 extends rigidly from the re-setting plate 125 and freely through an opening in the plate 114 to a hinged connection with a relatively short link 129 extending rearwardly from the upper end of a lever 131 mounted on the frame plate 17 rearwardly thereof for rocking in a vertical plane. As particularly shown, the lever 131 is intermediately pivoted on a pin 132 mounted in a forked bracket 132' fixed to the rear frame plate 17, and the lower end of the lever 131 is provided with a roller 133 which is in constant engagement with the eccentric camming edge 134' of a plate cam 134 fixed on the shaft 93 in the plane of movement of the roller, said roller being arranged to constantly engage the cam edge 134' of the cam 134 to prevent a contact of the re-setting plate 125 with the pin-supporting plate 114 when the former is in its limiting forward position.

In the present assembly, the front and rear positionings of the spindle 23, and of the switch arm 33 carried by it, are under control of a plate cam 135 fixed on the shaft 93 and having its peripheral camming edge 135' constantly engaged by a roller 136 mounted at the lower end of a lever 137 which is intermediately hinged on a pivot pin 138 carried by a bracket 138' extending rearwardly from the frame plate 17, the roller 136 being held against the edge 135' by the action of a tension spring 139 which is operative between the bracket 139 and a lever point below its pivot 138. The upper arm of the lever 137 adjustably carries a member 141 which is arranged for contact with the rounded rear end 37'' of the plunger 37 which controls the forward movement of the spindle 33. As is particularly brought out in Figures 1 and 4 and 11, the member 141 comprises a screw having its head 141' engageable with the end 37" of the plunger 37 while its shank is threadedly engaged in the upper lever end for its securing in adjustably set position by means of a locknut 141" mounted on it and engaging the lever end.

It will now be particularly noted that the shaft 93 is arranged to control and effect substantially all operations of the present unit after its primary actuation, and that only a single rotation of said shaft is provided for in connection with each re-setting of the present indicator unit, this being accomplished through an appropriate control of the delivery of actuating power to the shaft-operating motor 94. Accordingly, a normally open push switch 143 for manual closing is provided at a convenient exterior location on the unit casing 25 in parallel connected relation with a switch 144 which is controlled by a plate cam 145 mounted on the shaft 93; as shown, the switch 143 is located at an upper point of the casing front 26. As is brought out in Figures 1 and 2 and 13, the switch 144 is mounted on the frame plate 17 and comprises forward and rear conductor spring arms 146 and 147 providing opposed terminal contacts 146' and 147' for mutual engagement to close the motor circuit thereat. The spring arm 146 mounts a cam-contacting member 148 providing a V-point 148' for constantly engaging the edge of the cam 145, and said edge is circular except for a relatively short depressed edge portion providing the bottom of a notch 145' in which the member 148 is arranged to be disposed when the shaft 93 is static.

Noting that the switch 144 will be reopened upon the re-engagement of the point 148' of the member 148 in the notch 145' for a stopping of the motor at the end of a re-setting cycle of operations of the present mechanism, means are preferably provided for effecting a prompt and dependable stopping of the motor action following such opening of the motor power circuit. As is particularly brought out in Figure 1, the shaft 93 mounts a radial arm 149 having its extremity providing a coaxially curved end face 149' for contact with a spring-pressed brake shoe 151 which is carried on the rear frame plate 17. The present brake shoe 151 is carried on an arm 152 disposed opposite the plane of movement of the arm 149 and pivoted at its bottom to the bottom leg 153' of a C-frame 153 fixed to the plate 17 generally opposite the shaft 93. A helical compression spring 154 is axially operative between the intermediate portion of the C-frame 153 and the opposed arm 152 to urge the brake arm 149 rearwardly, and the upper leg 153" of the frame 153 has a turned-down extremity which is operative as a stop to appropriately limit the movement of the shoe-carrying arm 152 toward the axis of the shaft 93. The brake means thus provided is arranged to effect a stopping of the shaft rotation after the member 148 has dropped into the notch 145 and before the switch arm 146 can again be displaced by the cam 145 to close the switch.

Energizing current for the various electromagnets 122 which are energizable to release appropriate stop pins 113 in accordance with a setting of the switch arm 33 is arranged to be provided at the appropriate time during a re-setting cycle of the present indicator unit through a master-switch 155 mounted on the rear frame member 17 and having spring arms 156 and 157 provided with normally separated contacts 156' and 157'. The switch arm 156 is provided with a transversely offset control extension 156" which is disposed for constant engagement with the peripheral edge of a plate cam 158 fixed on the shaft 93 in the plane of the switch arms. The cam 158 has a circular cam edge except at a circumferentially short projection 158' thereof whereby the switch 155 is arranged to be closed solely while the switch arm 156 is displaced by the engagement of the cam projection 158' with the switch arm end 156". As particularly shown, the motor circuit switch 144 and the stop-release switch 155 are mounted on a common bracket arm 159 extending from the frame plate 17 below the shaft 93, with the switch arms appropriately insulated and suitably arranged for the connection of the appropriate circuit wires thereto at their fixed ends.

The arm 157 of the switch 155 is connected by a conductor wire 161 with one terminal of the secondary of a transformer 162, or other suitable source of electric current, and the switch arm 156 of the switch 155 is connected by the wire 75 with the distributor ring 71 of the multiple commutator switch assembly with which the spring contacts of the switch arm 33 are engaged. It will now be noted that the three wires 76 are connected in order to the solenoids of the electro-magnets 122 which control the stop pins 113 which are extendable in the path of lowering of the cross-head 111 controlling the setting of the hundreds wheel 82, the ten wires 77 are correspondingly connected to the solenoids of the electro-magnets which similarly control the stop pins 113 for the tens wheel 83, and the ten wires 78 are connected to the solenoids 122" of the electro-magnets 122 which similarly control the stop pins 113 for the units wheel 84. The other terminals of the electro-magnet solenoids are connected by branch wires 164 to a common circuit wire 165 which comprises a branch of a wire 166 from the other terminal of the transformer 162; the foregoing connections are essentially such that only the stop pins 113 of the three different sets thereof which correspond to a new sensed load are released when the projection 158' of the cam 158 has closed the switch 155 following the turning of the wheels to their limiting turn position through the action of the cam 95 to appropriately rock the member 91. As shown, the transformer 162 is conveniently mounted on a support plate 167 fixed to and across the tops of the frame plates 16 and 17 to one side of the indicator wheel assembly, the primary of said transformer being connected with a power socket 168 by wires from an attachment plug 169.

A branch 171 of the wire 166 from the transformer 162 includes the motor 94 which is arranged to actuate the control shaft 93 in operative cycles thereof, and is branched beyond the motor to provide a connection 172 with one terminal of the manually closable switch 143 and a connection 173 with the arm 146 of the cam-controlled switch 144. An extension or branch 174 of the wire 161 is branched to provide a connection 175 with the other terminal of the switch 143 and a connection 176 with the arm 147 of the switch 144, whereby to provide the normally open switches 143 and 144 as alternative controls for the motor circuit. The present relatively simple motor control means is essentially such that a closing of the motor-energizing circuit at the push-button switch 143 energizes the motor for rotating the cam 145 to promptly close the switch 144 for a continued operation of the motor independently of the subsequent condition of the switch 143 which would, in practice, be held closed only long enough to permit the cam closing of the motor circuit switch 144 and to effect the subsequent automatic reopening of the switch 144 by reason of the re-engagement of the V-point 148' in the notch 145' of the cam 145 to provide for the functioning of the described shaft brake to stop the shaft rotation while the point 148' remains in the notch.

It will now be noted that, following the manual closing of the primary motor-energizing switch 143 after the switch arm 33 has assumed a static sensed position in accordance with a loading of the scales mechanism which downwardly actuates the rack bar 21 from its zero setting, the resulting rotation of the control shaft 93 is arranged to cyclically—

1. Actuate the cam 145 for closing the switch 144 for effecting a maintenance of the shaft rotation independently of the switch 143,
2. Actuate the cam 95 against the lever 96 for effecting a lifting of the cross-head arms 112 above the lines of stop pins 113,
3. Actuate the cam 134 against the lever 131 to operatively displace the re-setting plate 125 for restoring any projected stop pins 113 to their rearwardly dogged positions,
4. Actuate the cam 135 against the lever 137 for effecting a forward displacement of the spindle 23 to secure the arm 33 in set sensed position by the action of the detent roller 55,
5. Actuate the cam 158 to close the switch 155 to energize the electro-magnet circuits which are then closed at contacts 62 and 63 and 64 of the spring arm 33 to release the appropriate stop pins 113 for their extension into the paths of the cross-head arms 112 which are subsequently lowered as the continued rotation of the cam 95 permits a return swinging of the lever 96 to its normal position, and finally
6. Permit the re-engagement of the projection 148' of the arm 146 of the switch 144 in the notch 145' of the cam 145 to open the motor circuit and provide for the stopping of the shaft rotation by the action of the brake shoe 151 on the arm 152.

It will now be noted that the present apparatus is particularly adapted for the cooperative association therewith of a device for printing on a receiving card, or the like, the number combinations cooperatively displayed by the wheels 82 and 83 and 84. As brought out in Figures 1 and 4 and 10, the rocker members 87 are provided with forwardly extending arms 181 of segmental outline including type bars 182 providing thereon numeral type 183 providing numerals corresponding to the numerals 85 on the wheels 82 and 83 and 84 associated with the different rocker members. When a particular combination of wheel numerals 85 is displayed in and across the sight opening 29', the corresponding numeral type 183 of the segments 181 are disposed in a line opposite an opening in the rear wall of a casing 184 which mounts inked ribbons 185 extending opposite said type bar. A platen bar 186 is provided in the casing 184 for its tranverse projection toward said line of type, whereby a card or strip of paper 187 interposed between the ribbon and type may have the type characters printed on it by reason of a projection of the platen bar 186 against the ribbon, said bar being shown as carried on a lever 188 for hand operation. In this manner, a particularly simple means is provided for recording a particular or successive weight indications, it being recalled that such indications are normally maintained until a subsequent weighing is effected.

From the preceding disclosure, it will be understood that I have provided an indicator device of particularly simple and compact structure for its purposes and which is particularly adapted for use with weighing scales in public use, since it provides positive indications without the "parallax" and other inaccuracies involved in referring to indicator elements moving opposite an array of relatively small number characters to be read only while the indicating element is sensed by a load on the scales. Furthermore, a purchaser of goods being weighed may have more confidence in the scales and the indication thereof by reason of the maintenance of the indication after the load is removed and may even be provided with a printed record of the same indication. With reference to the range of weights to be indicated, it will be understood that the weighing capacity of the scales may be increased by the appropriate use of unit weights with the scales in a manner well understood in the weighing-scale art.

From a consideration of the foregoing disclosure, it will be understood that the operative processes of my invention may obviously be provided in assemblies presenting more or less than three-denomination numbers, and that, in the present structure, the number of contacts provided for the left-side (hundreds) digit of an indicated number may be anywhere from two to ten inclusive, with appropriate changes in the total numbers of contacts provided for the second (tens) and third (units) sets of digits. It will thus be understood that the basis of design for a unit to provide numbers having a desired denominational range is that the limiting left-side (highest denomination) numeral of a displayable number may be any numeral from one to nine inclusive, that any numeral of a set of ten numerals zero to nine may provide each of the lower denomination numbers, that the display of numbers of the lower denominations requires the provision and control of only ten stop pins for each lower denomination, and that each denominational series of switch contact sets of ten has ten times as many sets of contacts as there are sets for the next highest denomination. Furthermore, while I have particularly described the indicator device of my invention as being sensed for its indicating actuation in accordance with the load on a weighing machine or scales, it will be understood that the device is applicable to computing machines and other mechanisms providing, or providable with, elements having their positions arranged to be sensed in accordance with values which are expressible by combinations of numbers.

From the foregoing description taken in connection with the accompanying drawings, the advantages of the present indicator device will be readily understood by those skilled in the art to which the invention appertains. While I have described the principle of operation, together with a form of my invention which I now consider to comprise a preferred embodiment thereof, I desire to have it understood that the showing is primarily illustrative, and that such changes and developments may be made, when desired, as fall within the scope of the following claims.

I claim:

1. In combination with a movable element which is disposable in different fixed sensed positions in accordance with the operation of a machine, an indicator means comprising a member providing thereon the numerals zero to nine inclusive in a line for their selective display at a predetermined viewing point by reason of a shifting adjustment of the member against resiliently yielding resistance, means mechanically associated with the member for effecting its shifting to selectively display said numerals at said viewing point, means operative to temporarily over-set said member beyond the position for its display of the terminal numeral of the line at said viewing point, normally withdrawn stop members corresponding to the different member numerals and selectively disposable to limit the return movement of the member for the display of the numeral corresponding to the sensed position of the element, and means operative while the member is over-set for effecting an operative disposal of the stop member corresponding to the set position of the element.

2. A structure in accordance with the claim 1 provided with means operative to withdraw an extended said stop member preceding a sensed resetting of the movable element.

3. In combination with a movable element which is disposable in different fixed sensed positions in accordance with the operation of a machine, an indicator means comprising a rotatable wheel providing thereon the numerals zero to nine inclusive in a line for their selective display at a predetermined viewing point by reason of a rotative adjustment of the wheel against resiliently yielding resistance, means mechanically associated with the wheel for effecting its rotative adjustment against said resistance to selectively display said numerals at said viewing point, means operative to temporarily over-set said wheel beyond the position for the display of the numeral nine at said viewing point, normally withdrawn stop members corresponding to the different wheel numerals and selectively disposable to limit the return rotation of the wheel for the display of the numeral corresponding to the sensed position of the element, and means operative while the wheel is over-set for effecting the release of solely the stop member corresponding to the set position of the element for providing the set display of the appropriate numeral at the viewing point.

4. In combination with a movable element which is disposable in different fixed sensed positions in accordance with variable operative factors of a machine, an indicator means comprising a rotatable wheel providing thereon the numerals zero to nine inclusive in their order for selective display at a predetermined viewing point by reason of a rotative adjustment of the wheel, an arm member swingable about a fixed axis and mechanically associated with the wheel for effecting its rotative adjustment by rocking movements thereof to variably display said numerals at said viewing point, a multiple switch for setting to selectively close thereat circuits corresponding to the different said numerals in accordance with settings of the element, means operative to swing said arm member to rotate said wheel beyond the position for its display of the numeral nine at said viewing point, spring-pressed normally withdrawn stop members disposable to limit the return movement of the arm member, means for closing the switch circuit corresponding to the sensed positioning of the movable element, and means of the closed circuit operative to effect the release of the corresponding said stop member for the set display at the viewing point of the wheel numeral corresponding to the set position of the sensed element.

5. In combination with a movable element which is disposable in different fixed sensed positions in accordance with variable operative factors of a machine, an indicator means comprising a member providing thereon the numerals zero to nine inclusive in their order for selective display at a predetermined viewing point by reason of a shifting adjustment of the member against a resiliently yielding resistance, means mechanically associated with the member for effecting its shifting adjustment to selectively display said numerals at said viewing point, a multiple switch for selectively closing thereat circuits which are normally open elsewhere and correspond to the different said numerals, means operative to temporarily over-set said member beyond the position for its display of the numeral nine at said viewing point, spring-pressed normally withdrawn stop members disposable to limit the return movement of the member, electro-magnetic catches in said circuits normally securing the stop members in withdrawn position, and means for closing the switch circuit which is closed at the multiple switch for actuating its electro-magnet catch to release the corresponding said stop member to limit the return movement of the displaced arm member for the display at the viewing point of the numeral corresponding to the set position of the secured element.

6. In combination with a movable element which is disposable in different fixed positions in accordance with variable factors relating to the operation of a machine, a movable indicator member bearing the numerals zero to nine inclusive in their order and disposable for a selective display of a said numeral at a predetermined viewing point, a multiple switch providing a series of fixed contacts corresponding to the different numerals on the indicator member, a switch arm providing a contact and movable to a sensed static position thereof by and in accordance with a setting of the element for engaging a said fixed contact to close thereat an electric circuit including a normally open master-switch, means independently operative following a static sensed positioning of the switch arm to temporarily effect a limiting displacement of the indicator member beyond its position for the display of the numeral nine while the master-switch is open, normally withdrawn stop members corresponding to the numerals and selectively disposable to limit the return movement of said indicator member from its limiting displaced position for a display of a numeral thereof, means of the closed multiple-switch circuit for effecting an operative disposal of the corresponding stop member by and upon a closing of the master-switch, and means operative to close said master-switch for an operative disposal of said stop member while the indicator member is in its limiting displaced position.

7. In combination with a movable element which is disposable in different fixed and numerically-expressible sensed positions, a movable indicator member bearing a line of the numerals zero to nine inclusive in their order and disposable for a selective display of a said numeral at a predetermined viewing point, a multiple switch providing a series of relatively fixed contacts corresponding to the numerals on the indicator member, a switch arm disposable in a sensed static position thereof in accordance with a setting of the element and providing a switch contact in normally spaced relation from an opposed first contact corresponding to the arm setting, and arranged for its displacement following a static setting of the switch arm to engage its contact with the opposed first contact to close thereat an electric circuit including a master-switch which is normally open, means operative to temporarily effect a limiting displacement of the indicator member beyond its position for the display of the numeral nine while the master-switch is open, normally withdrawn stop members corresponding to the different numerals selectively disposable to limit the return movement of said indicator member from its limiting position for a display of the sensed numeral, means in the closed circuit of the multiple switch operative to release the stop member for its operative disposal by and upon a closing of the master-switch, means operative while the indicator member is disposed in its limiting position to return a previously-projected stop member to its withdrawn position, a motor-driven control shaft having means operable to successively engage the contact of the statically-sensed switch arm with the opposed fixed switch contact and to actuate the indicator display means to dispose the indicator member to its said limiting position and to return any projected stop member to its withdrawn position while the indicator member is displaced and to close the master-switch for effecting the projection of the appropriate stop member and for a return of the indicator member for its sensed setting by its engagement with the projected stop, an electric motor for actuating said shaft, and an electric power circuit for said motor including a manually-closable starting switch and a power-maintaining switch controlled by means of the shaft and a circuit-opening switch controlled by said shaft for limiting the shaft to a single rotation thereof for each sensed setting of the indicator member.

LAURENCE R. SAYER.

References Cited in the file of this patent
UNITED STATES PATENTS

| Number | Name | Date |
| --- | --- | --- |
| 1,446,552 | Dunn | Feb. 27, 1923 |
| 1,504,609 | Crane | Aug. 12, 1924 |
| 2,007,317 | Bohuszewicz | July 9, 1935 |
| 2,121,227 | Haegele | June 21, 1938 |
| 2,222,364 | Dillon, Jr. et al. | Nov. 19, 1940 |
| 2,544,038 | Nicaise | Mar. 6, 1951 |